US007324318B2

(12) United States Patent
Harwath et al.

(10) Patent No.: US 7,324,318 B2
(45) Date of Patent: Jan. 29, 2008

(54) MULTIPLE PLANAR INDUCTOR COAXIAL SURGE SUPPRESSOR

(75) Inventors: Frank A Harwath, Naperville, IL (US); Rodger Burke, Naperville, IL (US)

(73) Assignee: Andrew Corporation, Westchester, IL (US)

( * ) Notice: Subject to any disclaimer, the term of this patent is extended or adjusted under 35 U.S.C. 154(b) by 291 days.

(21) Appl. No.: 11/163,184

(22) Filed: Oct. 7, 2005

(65) Prior Publication Data

US 2007/0081287 A1 Apr. 12, 2007

(51) Int. Cl.
*H02H 1/00* (2006.01)

(52) U.S. Cl. .................................................... 361/119

(58) Field of Classification Search ................. 361/119
See application file for complete search history.

(56) References Cited

U.S. PATENT DOCUMENTS

| | | | | |
|---|---|---|---|---|
| 3,289,117 | A | 11/1966 | Kearns et al. | |
| 4,236,188 | A | 11/1980 | Prochazka | |
| 4,409,637 | A | 10/1983 | Block | |
| 4,525,690 | A | 6/1985 | De Ronde | |
| 4,584,624 | A | 4/1986 | Hines | |
| 4,701,825 | A | 10/1987 | Pagliuca | |
| 5,053,910 | A | 10/1991 | Goldstein | |
| 5,745,328 | A | 4/1998 | Bellantoni | |
| 5,982,602 | A | 11/1999 | Tellas et al. | |
| 6,061,223 | A * | 5/2000 | Jones et al. | 361/119 |
| 6,101,080 | A | 8/2000 | Kuhne | |
| 6,115,227 | A | 9/2000 | Jones et al. | |
| 6,236,551 | B1 | 5/2001 | Jones et al. | |
| 6,452,773 | B1 | 9/2002 | Aleksa et al. | |
| 6,636,408 | B2 | 10/2003 | Pagliuca | |
| 6,688,916 | B1 | 2/2004 | Lee | |
| 6,721,155 | B2 | 4/2004 | Rymann | |
| 6,785,110 | B2 | 8/2004 | Bartel et al. | |
| 2004/0100751 | A1 | 5/2004 | Ammann | |
| 2004/0169986 | A1 | 9/2004 | Kauffman | |

* cited by examiner

*Primary Examiner*—Ronald W. Leja
(74) *Attorney, Agent, or Firm*—Babcock IP, PLLC

(57) ABSTRACT

An in-line surge suppressor having a body with a bore between two ends and at least one channel located within the body and around the bore. An inner conductor is located within the bore. A shorting element has a plurality of segments that extend from the inner conductor, through extension grooves between the channel and the bore, into a common or separate channel(s). The segments coupled to the channel(s), proximate a distal end of each segment.

20 Claims, 2 Drawing Sheets

MULTIPLE PLANAR INDUCTOR COAXIAL SURGE SUPPRESSOR

BACKGROUND

1. Field of the Invention

The invention generally relates to surge protection of coaxial cables and transmission lines. More particularly, the invention relates to a compact surge protector with a high current capacity, for use in-line with a coaxial cable or transmission line, configurable for a range of different frequency bands.

2. Description of Related Art

Electrical cables, for example coaxial transmission lines of antenna towers, are equipped with surge suppression equipment to provide an electrical path to ground for diversion of electrical current surges resulting from, for example, static discharge and or lightning strikes.

Prior coaxial suppression equipment typically incorporated a frequency selective shorting element between the inner and outer conductors dimensioned to be approximately one quarter of the frequency band center frequency in length, known as a quarter wavelength stub. Therefore, frequencies within the operating band pass along the inner conductor reflecting in phase from the quarter wavelength stub back to the inner conductor rather than being diverted to the outer conductor and or a grounding connection. Frequencies outside of the operating band, such as low frequency surges from lightning strikes, do not reflect and are coupled to ground, preventing electrical damage to downstream components and or equipment.

Depending upon the desired frequency band, a shorting element dimensioned as a quarter wavelength stub may have a required dimension of several inches, requiring a substantial supporting enclosure. Where the supporting enclosure and any necessary interface to the surge suppressor body are not machinable along a single longitudinal axis of the surge suppressor body, additional manufacturing costs are incurred. Prior quarter wavelength stub surge suppressors, such as described in U.S. Pat. No. 5,982,602 "Surge Protector Connector" by Tellas et al, issued Nov. 9, 1999 commonly owned with the present application by Andrew Corporation and hereby incorporated by reference in the entirety, are largely machinable along a single longitudinal axis of the surge suppressor body and also reduces the required enclosure size by spiraling the shorting element within the enclosure. However, because the shorting element requires sufficient cross sectional area to carry the desired surge current load, the required enclosure is still relatively large and necessarily introduces a significant variation to the outer conductor diameter as it passes along the body of the surge suppressor. Variations in the outer conductor diameter introduce an impedance discontinuity that increases insertion losses.

The spiral aspect of the shorting element is an inductor structure that increases the inductance of the shorting element. The high frequency magnetic field effects of an inductor structure having an affect on the impedance of the frequency selective shorting element that allows the overall length of the shorting element to be reduced, compared to a straight or minimally spiraled quarter wavelength stub. Precision manufacture by machining or bending of a range of different spiral inductor shorting element configurations, to allow supply of a surge suppressor optimized for each of a range of different frequency bands, adds a significant manufacturing cost and lead time to the resulting family of surge suppressors.

Competition within the electrical cable, connector and associated accessory industries has focused attention on cost reductions resulting from increased manufacturing efficiencies, reduced installation requirements and simplification/overall number of discrete parts reduction.

Therefore, it is an object of the invention to provide an apparatus that overcomes deficiencies in the prior art.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION

The inventors have developed an inline surge suppressor with improved current capacity and reduced return loss characteristics. The prior single spiral inductor shorting element is replaced by a shorting element with dual inductor segment pairs coupled to the inner conductor. By extending the shorting element away from the inner conductor along extension segment(s) before initiating curved segment(s) within a channel of the enclosing body (outer conductor), the outer conductor diameter variation and parasitic capacitance between the shorting element and the inner conductor is minimized. Inline surge suppressors according to the invention also have significant manufacturing efficiencies because the shorting element may be stamped and the surge suppressor body components may be configured for manufacture by turning along a single longitudinal axis of the body.

Figure 1:
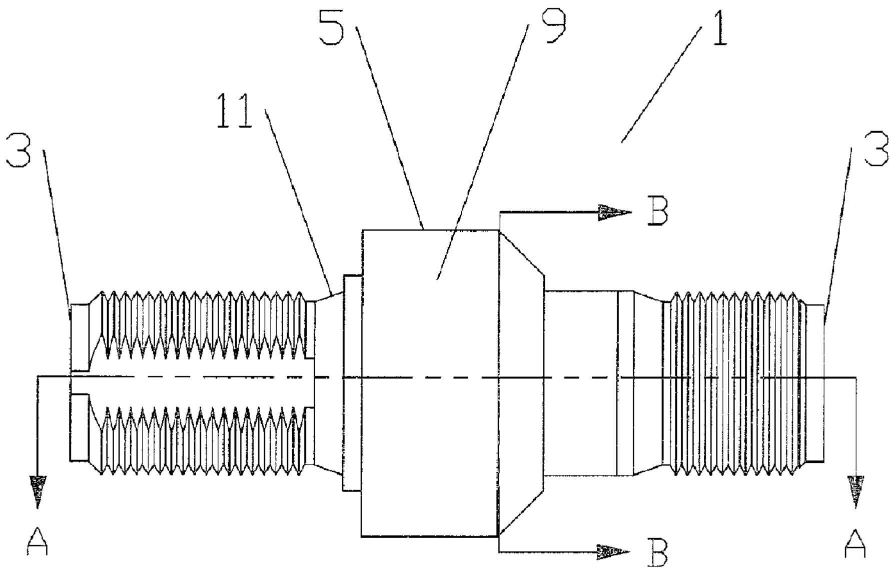
FIG. 1 is an external side schematic view of an exemplary embodiment of the invention.
Figure 2:
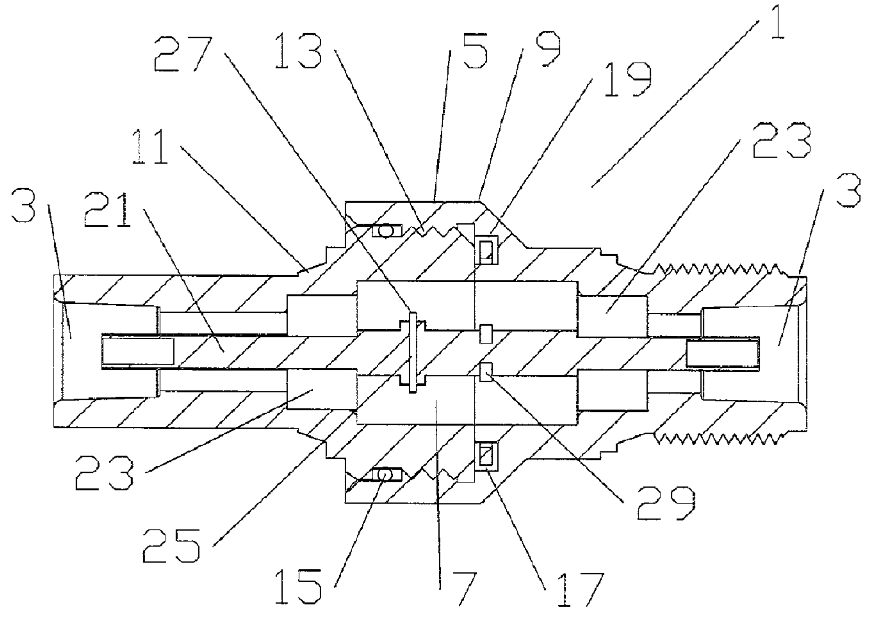
FIG. 2 is an cut-away side schematic view of FIG. 1, along lines AA.
Figure 3:
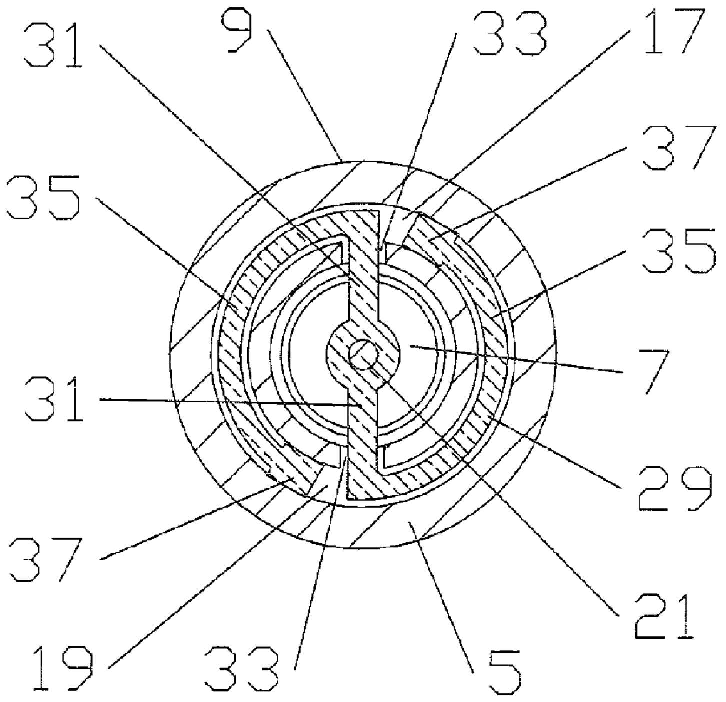
FIG. 3 is a cut-away end schematic view of FIG. 1, along lines BB.

An exemplary embodiment of the invention is described with reference to FIGS. 1-4. As shown in FIG. 1, a surge suppressor 1 according to the invention may be adapted for use in-line with a coaxial cable, having a desired cable or coaxial connector interface 3 at each end. As shown in FIGS. 2 and 3, a surge suppressor body 5 with a hollow central bore 7 is formed in complementary first and second portion(s) 9, 11 adapted to mate together. The coupling of the first and second portion(s) 9, 11 may be via, for example thread(s) 13 environmentally sealed by a gasket 15 such as an o-ring. A groove 17 formed, for example, in one of the first and second portions 9, 11 forms an enclosed channel 19 when the first and second portions 9, 11 are coupled together.

An inner conductor 21 extends coaxially within the hollow central bore 7 between each end of the body 5, supported by insulator(s) 23. A break 25 in the inner conductor 21, for example separated by a dielectric 27 may be applied as a direct current isolator. The surface area of each end of the inner conductor 21 at the break 25 and the thickness and dielectric value of any dielectric 27 applied are adapted for a desired impedance over a desired frequency band, such as 50 ohms, and an acceptable insertion loss.

A shorting element 29 is coupled between the body 5 (outer conductor) and the inner conductor 21 on the side of the break 25 from which a current surge is expected to originate. Segment(s) of the shorting element 29 extend from the inner conductor 21 towards the body 5 with at least two extension segment(s) 31 preferably aligned equidistant from each other around the inner conductor 21. Because multiple extension segment(s) 31 are applied, the cross sectional area required for a desired current level of each extension segment 31 is at least one half that of a conventional single spiral shorting element configuration. The extension segment(s) 31 extend from the inner conductor 21 into the channel 19 via corresponding extension groove(s) 33 formed between the channel 19 and the bore 7.

Figure 4:
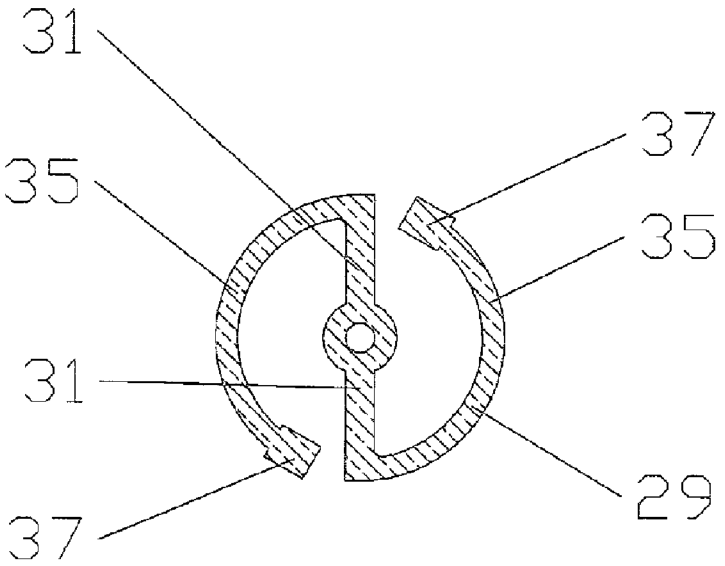
FIG. 4 is an end schematic view of the shorting element in FIGS. 2 and 3.

Upon entering the channel 19, the extension segment(s) 31 become curved segment(s) 35, extending along the channel 19 spaced away or otherwise insulated from the sidewalls of the channel 19. As shown in FIG. 4, a contact 37 dimensioned, for example, with an interference fit within the channel 19 is formed at the distal end of each curved segment 31, coupling the shorting element to the body 5 and thereby to the outer conductor. To reduce the manufacturing precision required, at least the curved segment(s) 35 may be coated with an insulating material, except for the contact(s) 37.

While the exemplary embodiment shows an annular channel 19 and curved segment(s) 35 that are formed as arcs mating within the channel 19, one skilled in the art will appreciate that the channel 19 may be formed at any distance from the inner conductor (with corresponding increases in the surge suppressor body 5 diameter, as required) and with any desired curvature, for example having a radius that increases and or decreases from each extension groove 33. Similarly, the channel 19 may be formed as several separate channel(s) 19, one for each curved segment 31, which may overlap one another within the body 5. The curved segment(s) 31 may fit within the channel 19 in configurations other than equidistant from the sidewalls of the channel 19. For example, the curved segment(s) 31 may be formed with an increasing or decreasing radius such that when seated within the channel 19, the contact(s) 37 are spring biased against the outer or inner sidewalls of the channel 19, in secure electrical connection.

The length and thereby the associated inductance of each extension and curved segment 31, 35 pair is adjustable by varying the length of the curved segment 35 between a minimum length wherein the extension segment 31 terminates at a contact 37 upon entering the channel 19 and a maximum length with the contact 37 positioned within the channel 19 just short of the next extension segment 31. Where multiple separate but overlapping channel(s) 19 are applied, or a channel wide enough to permit two portions of a curved segment 35 to seat therein without touching one another are applied, the maximum curved segment length may be extended, even further. Within these ranges, the shorting element may be tuned for minimal return losses over a desired frequency band.

Each of the curved segment(s) 35 are preferably symmetrical with respect to the others, minimizing return losses as each of the inductors formed by the respective extension and curved segment 31, 35 pairs is an equivalent symmetrical inductor in parallel with the others. While the invention has been demonstrated in an exemplary embodiment with dual extension and curved segment 31, 35 pairs it should be understood that, within the scope of the present invention, three, four or more pairs may be applied to the shorting element as desired. Larger numbers of extension and curved segment 31, 35 pairs having the advantage of greater current capacity for a selected segment cross sectional area.

Because the inductance generated by each extension and curved segment 31, 35 pair is concentrated in the respective curved segment 35, and the curved segment(s) 35 are enclosed within the channel 19, parasitic capacitance present between other curved portions of the shorting element and or the inner conductor of the prior single spiral inductor shorting element surge suppressors is reduced. Also, current carrying capacity is increased through the use of parallel extension and curved segment 31, 35 pairs, minimizing the overall size requirements of the body 5 necessary to contain the shorting element. Further, the isolation of the channel 19 from the inner conductor 21 within the body 5 allows changes to the diameter of the outer conductor along the length of the body 5 to be significantly reduced, thereby reducing the insertion loss of the surge suppressor 1, overall.

One skilled in the art will appreciate that the present invention also represents a significant improvement in manufacturing efficiency for in-line coaxial surge suppressors. The readily exchangeable surge suppression insert(s) 29 according to the invention have increased segment separation compared to the previous single spiral surge suppression elements permitting precision manufacture of a range of differently dimensioned shorting elements by cost effective stamping processes for a wide range of different frequency bands. Because the majority of body features are annular, turning along a single longitudinal axis may efficiently perform the majority of required body manufacturing operations. Also, surge suppressors according to the invention for specific frequency bands may be quickly assembled for on-demand delivery with minimal lead time, eliminating the need for large stocks of pre-assembled frequency band specific surge suppressor inventory. Further, should a surge suppressor be damaged or the desired frequency band of operation change, the shorting element 29 may be exchanged in the field.

Table of Parts

| | |
|---|---|
| 1 | surge suppressor |
| 3 | interface |
| 5 | body |
| 7 | bore |
| 9 | first portion |
| 11 | second portion |
| 13 | thread |
| 15 | gasket |
| 17 | groove |
| 19 | channel |
| 21 | inner conductor |
| 23 | insulator |
| 25 | break |
| 27 | dielectric |
| 29 | shorting element |
| 31 | extension segment |
| 33 | extension groove |
| 35 | curved segment |
| 37 | contact |

Where in the foregoing description reference has been made to ratios, integers, components or modules having known equivalents then such equivalents are herein incorporated as if individually set forth.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus, methods, and illustrative examples shown and described. Accordingly, departures may be made from such details without departure from the spirit or scope of applicant's general inventive concept. Further, it is to be appreciated that improvements and/or modifications may be made thereto without departing from the scope or spirit of the present invention as defined by the following claims.

What is claimed is:

1. An in-line surge suppressor device, comprising:

a body having a bore, the body formed from a first portion and a second portion adapted to couple together;

at least one of the first and the second portions having at least one groove that forms at least one enclosed channel when the first portion and the second portion are coupled together;

a shorting element extending between an inner conductor within the bore and the body, the shorting element having a plurality of extension segments extending from the inner conductor through a corresponding plurality of extension grooves in the body to the channel(s); and a curved segment extending along the channel(s) from each extension segment, a distal end of each curved segment having a contact electrically connected to the body.

2. The device of claim 1, wherein there are two extension segments.

3. The device of claim 2, wherein the curved segment(s) extending from each of the two extension segments are arranged within a single channel.

4. The device of claim 2, wherein the extension segments overlap one another in the single channel, isolated from each other.

5. The device of claim 2, wherein the curved segment(s) extending from each of the two extension segments are arranged each within a separate channel.

6. The device of claim 5, wherein the separate channel(s) overlap one another.

7. The device of claim 1, wherein the extension segments project radially from the inner conductor, equidistant from each other.

8. The device of claim 1, wherein the curved segment(s) are electrically insulated, except for the contact.

9. The device of claim 1, wherein the curved segment(s) are biased inward or outward, whereby the contact(s) are biased into electrical contact with the channel, upon insertion of the curved segment(s) into the channel.

10. The device of claim 1, wherein the inner conductor has a break separated by a dielectric.

11. An in-line surge suppressor, comprising:

a body having a bore;

a channel within the body and around the bore;

an inner conductor located within the bore;

a shorting element with a plurality of segments extending from the inner conductor, through extension grooves between the channel and the bore, into the channel;

the segments each coupled proximate a distal end to the channel.

12. The device of claim 11, wherein the inner conductor has a break separated by a dielectric.

13. The device of claim 11, wherein a length of the segments within the channel is selected to minimize return loss within a desired frequency band.

14. The device of claim 11, wherein the body is formed from two portions adapted to couple together.

15. The device of claim 14, wherein the two portions couple together via threads that are environmentally sealed by a gasket.

16. The device of claim 11, wherein the segment(s) within the channel are electrically insulated from the channel, except for the distal end(s).

17. An in-line surge suppressor, comprising:

a body having a bore extending between two ends, an inner conductor positioned coaxial within the bore, a shorting element with a plurality of segments extending from the inner conductor, through a corresponding plurality of extension grooves in the body, to a channel around the bore; the bore having a substantially constant diameter between the two ends.

18. The device of claim 17, wherein the shorting element has curved segments that extend along the channel;

a distal end of each curved segment having a contact in electrical contact with the channel.

19. The device of claim 17, wherein the shorting element has two extension segments extending radialy from the inner conductor to the channel;

the extension segments formed with a common axis.

20. The device of claim 17, wherein the segment(s) within the channel are electrically insulated from the channel, except for a distal end(s) of the segment(s).

* * * * *